(12) United States Patent
Robison

(10) Patent No.: US 7,178,544 B2
(45) Date of Patent: Feb. 20, 2007

(54) COMBINATION SHUT-OFF AND RESETABLE EXCESS FLOW VALVE

(75) Inventor: David L. Robison, Ashtabula, OH (US)

(73) Assignee: Perfection Corporation, Madison, OH (US)

( * ) Notice: Subject to any disclaimer, the term of this patent is extended or adjusted under 35 U.S.C. 154(b) by 194 days.

(21) Appl. No.: 10/903,195

(22) Filed: Jul. 30, 2004

(65) Prior Publication Data

US 2005/0022872 A1 Feb. 3, 2005

Related U.S. Application Data

(60) Provisional application No. 60/491,614, filed on Jul. 31, 2003.

(51) Int. Cl.
*F16K 17/30* (2006.01)
(52) U.S. Cl. .......................... 137/2; 137/462; 137/517; 137/614.17
(58) Field of Classification Search ............... 137/460, 137/462, 504, 517, 599.18, 614.17, 2
See application file for complete search history.

(56) References Cited

U.S. PATENT DOCUMENTS

| | | | |
|---|---|---|---|
| 1,119,191 A | 12/1914 | Purser | |
| 3,106,937 A * | 10/1963 | Sands | 137/462 |
| 3,854,497 A * | 12/1974 | Rosenberg | 137/614.17 |
| 4,373,548 A | 2/1983 | Chou | |
| 4,690,170 A | 9/1987 | Tsai et al. | |
| 5,076,321 A * | 12/1991 | Terry | 137/460 |
| 5,613,518 A * | 3/1997 | Rakieski | 137/517 |
| 6,003,550 A | 12/1999 | Saarem et al. | |
| 2004/0074542 A1* | 4/2004 | Flauzac | 137/614.17 |

OTHER PUBLICATIONS

ASTM International Standard Designation: F 1802-97 entitled Standard Test Method for Performance Testing of Excess Flow Valves.

* cited by examiner

*Primary Examiner*—Stephen M. Hepperle
(74) *Attorney, Agent, or Firm*—Fay Sharpe, LLP

(57) ABSTRACT

A valve operable with an associated fluid delivery system having fluid flow therethrough includes a housing, a valve body and a resetable excess flow valve. The housing has a first passage and the valve body is disposed along the first passage and including a wall at least partially defining a second passage. The excess flow valve is supported along one of the first and second passages. The valve body is displaceable between a first position permitting flow through the second passage and a second position substantially shutting-off fluid flow and resetting the excess flow valve.

18 Claims, 15 Drawing Sheets

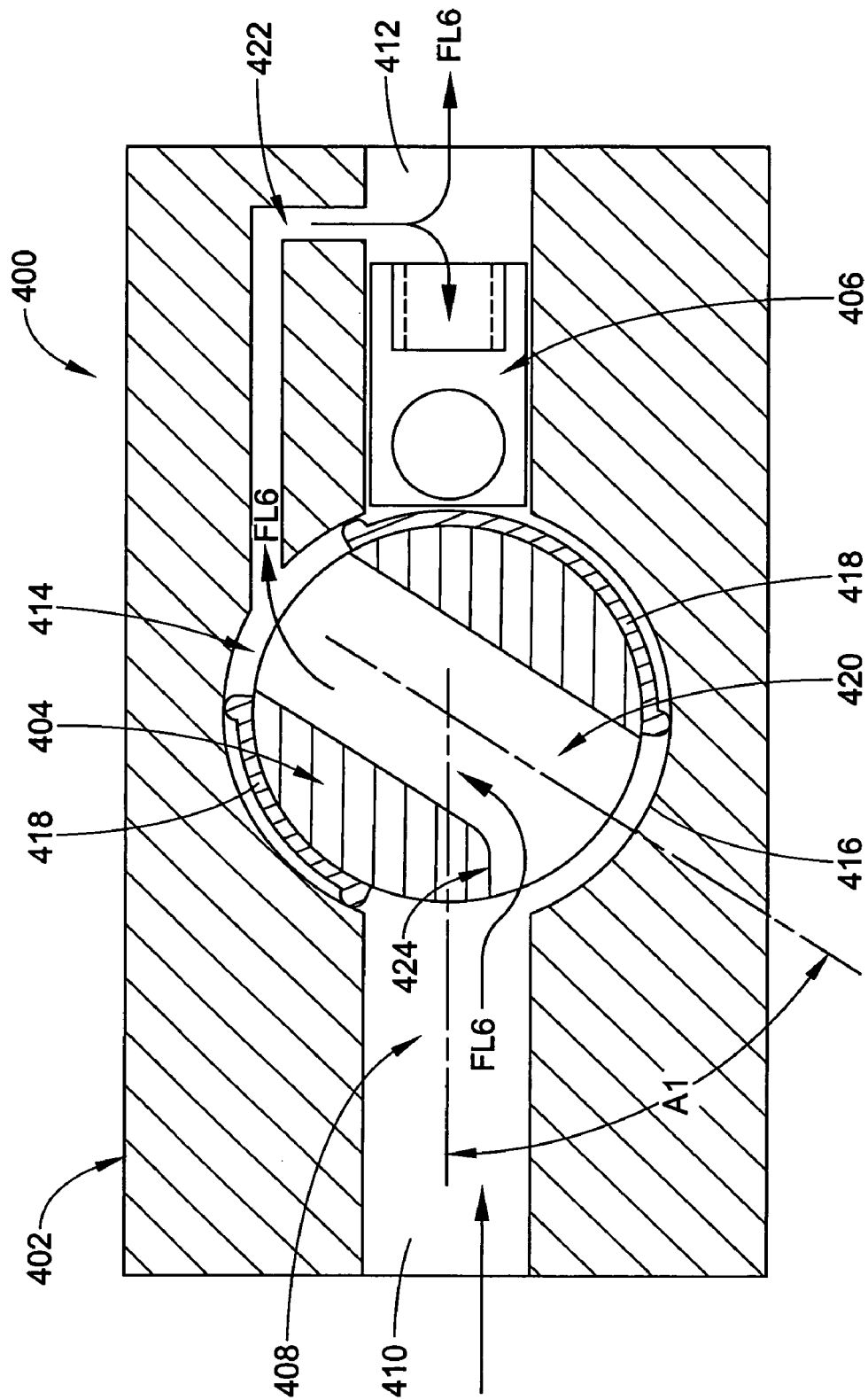

COMBINATION SHUT-OFF AND RESETABLE EXCESS FLOW VALVE

This application claims the benefit from Provisional Patent Application Ser. No. 60/491,614 filed on Jul. 31, 2003, which is hereby incorporated herein by reference in its entirety.

BACKGROUND

The present invention broadly relates to the art of fluid delivery systems and, more particularly, to a combination shut-off and excess flow valve for use in association along transmission lines of such systems.

The present invention relates generally to fluid delivery systems. It finds particular application in conjunction with underground gas distribution systems and will be described with particular reference thereto. However, it is to be appreciated that the invention is equally applicable for use in other environments, including above-ground installations, such as in industrial and/or commercial buildings, for example. Additionally, the present invention is particularly well suited for use with non-bypass type excess flow valves. However, it is to be distinctly understood that bypass type excess flow valves can also be used without departing from the principles of the present invention.

Shut-off valves and excess flow valves are each well known and commonly used in gas distribution systems. Typically, a shut-off valve is installed along a gas delivery line adjacent the connection or tie-in of the same with a main supply line. Such shut-off valves are commonly buried under ground in a small box or vault and are normally accessible through a pipe or passage extending from the ground surface down to the actuation feature of the valve. The shut-off valve can be displaced between open and closed positions using a suitable long-handled wrench or other device that is extended down through the passage to engage the actuation feature of the valve. As such, where repairs or other modifications are being made downstream along the delivery line, the shut-off valve is routinely closed to terminate gas flow along the downstream portion of the delivery line.

When used, an excess flow valve of either the bypass or non-bypass type is typically installed along a gas delivery line downstream of the shut-off valve. The excess flow valve acts to shut off the flow of gas through the delivery line where a break occurs in the delivery line, such as due to third party damage or a natural disaster, for example. Typically, the excess flow valve is buried in the ground and is not accessible without excavation. Bypass type excess flow valves are adapted to allow the passage of a small amount of gas, usually less than 20 CFM, even though the valve has been tripped and remains closed. This allows the bypass-type excess flow valve to automatically reset when the line pressure on both sides of the valve becomes substantially equalized. Where a non-bypass excess flow valve is used, the repaired line is re-pressurized using an external pressure source. This is commonly done by supplying compressed air or another gas from a point upstream of the excess flow valve, typically at the gas meter. While both types of excess flow valve have been successfully used for a considerable period of time, certain disadvantages have been perceived that have reduced the adoption and wide spread installation of excess flow valves. One of the primary perceived disadvantages is that there is no external indicator of the condition (i.e., open or closed position) of an installed excess flow valve.

In an attempt to overcome this perceived disadvantage associated with the use of traditional excess flow valves, combination shut-off and excess flow valves have been devised. One such valve is disclosed in Saarem, et al., U.S. Pat. No. 6,003,550, for example. In Saarem, a valve body is rotatably supported on a housing, and an excess flow valve is disposed along a passage through the valve body. The valve body is rotatable between a first flow position, a second shut-off position oriented at an angle of about 90 degrees from the first position and a third position for resetting a tripped excess flow valve that is oriented at an angle of about 180 degrees from the first position.

In operation, the Saarem valve is set in the first position and the excess flow valve operates in a traditional manner. When an excess flow condition occurs, the excess flow valve trips or closes substantially preventing the flow of gas therethrough. The valve body can thereafter be moved to the shut-off position while repairs are made to the distribution line. Once the repairs are complete, the valve can be moved to the third, reset position in which the flow of gas along the line causes the excess flow valve to return to its open position. The valve must then be returned to its first position in which the excess flow valve is in the proper orientation relative to the fluid flow direction along the line to operate in a typical manner. One significant disadvantage of such valves, however, is that if the valve is left in the third, resetting position, the excess flow valve will remain open regardless of the flow conditions. As such, a repair technician who is unsure of which direction the valve was initially in and/or is inattentive in resetting the valve may inadvertently leave the valve in the reset position.

BRIEF DESCRIPTION

In accordance with the present invention, a combination shut-off and resetable excess flow valve is provided that avoids or minimizes the problems and difficulties encountered with valves of the foregoing nature, while providing improved operation, and maintaining a desired simplicity of structure and economy of manufacture.

More particularly in this respect, a valve operable with an associated fluid delivery system having fluid flow therethrough is provided that includes a housing including a first passage. A valve body is disposed along the first passage and includes a wall at least partially defining a second passage. A resetable excess flow valve is supported along one of the first and second passages. The valve body is supported on the housing for movement between a first position that permits fluid flow through the second passage and a second position that substantially shuts off fluid flow through the second passage and reset the excess flow valve.

Additionally, a combination shut-off and excess flow valve is provided that includes a housing having a first passage extending therethrough. The first passage includes an inlet portion and an outlet portion. A valve body is supported on the housing and is disposed along the first passage between the inlet and outlet portions. The valve body is displaceable between a first position and a second position and includes a wall that at least partially defines a second passage. A sealing member forms a substantially fluid-tight seal between the valve body and the housing. An excess flow valve is disposed along one of the first passage and the second passage and has a first end and a second end. The second passage is substantially aligned with the first passage in the first position of the valve body such that the inlet portion and the outlet portion are in fluid communication, and the first end of the excess flow valve is operatively associated with the inlet portion of the first passage. The valve body substantially fluidically isolates the inlet portion and the outlet portion from one another in the second position, and the second end of the excess flow valve is operatively associated with the inlet portion of the first passage in the second position of the valve body.

Furthermore, a valve is provided that includes a housing including a first passage extending therethrough between opposing ends. A valve body is supported on the housing and is disposed along the first passage. The valve body is displaceable between first and second positions and includes a second passage extending therethrough that is in fluid communication between the opposing ends of the first passage in the first position of the valve body. A sealing member is sealingly positioned between the valve body and the housing. An excess flow valve is disposed along one of the first and second passages and is transformable between a first condition and a second condition. The valve also includes means for resetting the excess flow valve from the second condition to the first condition in the second position of the valve body in which the opposing ends of the first passage are also substantially fluidically isolated from one another.

Further still, a method of operating a valve adapted for use in a fluid delivery system susceptible to an excess flow condition is provided and includes a step of providing a valve including a housing with a first passage therethrough, a valve body disposed along the first passage and including a second passage, and an excess flow valve (EFV) supported along one of the first and second passages. After experiencing an excess flow condition, another step includes displacing said valve body from a first, flow permitting position to a second, shut-off and EFV reset position. A further step includes returning said valve body to the first position to permit fluid flow through said valve.

Another combination shut-off and excess flow valve that is operable with an associated fluid delivery system having fluid flow therethrough is provided that includes a housing having a first passage and a second passage. The first passage has an inlet portion, an outlet portion downstream of the inlet portion and a valve chamber in fluid communication between the inlet and outlet portions. The second passage has a first end in fluid communication with the valve chamber and a second end in fluid communication with one of the inlet and the outlet portions of the first passage. A valve body is supported on the housing within the valve chamber and is displaceable between a first position and a second position. The valve body includes a third passage extending therethrough. A sealing member forms a substantially fluid-tight seal between the valve body and the housing, and an excess flow valve is disposed along one of the first and third passages. The excess flow valve has a first port and a second port in fluid communication with the first port through the excess flow valve. The third passage is in fluid communication with the inlet and outlet portions of the first passage in the first position of the valve body, and the first port of the excess flow valve is upstream of the second port in the first position of the valve body. The valve body in the second position substantially fluidically isolates the inlet and outlet portions of the first passage, and the second port of the excess flow valve is upstream of the first port as fluid flows through the second passage from the inlet portion of the first passage.

Still another combination shut-off and excess flow valve operable with an associated fluid delivery system having fluid flow therethrough is provided that includes a housing having a first passage extending therethrough. The first passage has an inlet portion and an outlet portion downstream of the inlet portion. A valve body is supported on the housing in fluid communication between the inlet portion and the outlet portion and is displaceable between a first position and a second position. The valve body includes second and third passages extending therethrough. A sealing member is sealing positioned between the valve body and the housing, and an excess flow valve is disposed along the second passage of the valve body. The excess flow valve has a first port and a second port in fluid communication with the first port through the excess flow valve. The second passage extends in fluid communication between the inlet portion and the outlet portion of the first passage in the first position of the valve body such that the first port of the excess flow valve is upstream of the second port. The valve body substantially fluidically isolates the inlet portion and the outlet portion of the first passage in the second position. The third passage extends in fluid communication between the inlet portion of the first passage and the second passage such that the second port of the excess flow valve is upstream of the first port.

BRIEF DESCRIPTION OF THE DRAWINGS

FIG. 13 is a top plan view, partially in section, of the valve of FIG. 12 with the valve body in a second position.

DETAILED DESCRIPTION

Figure 1:
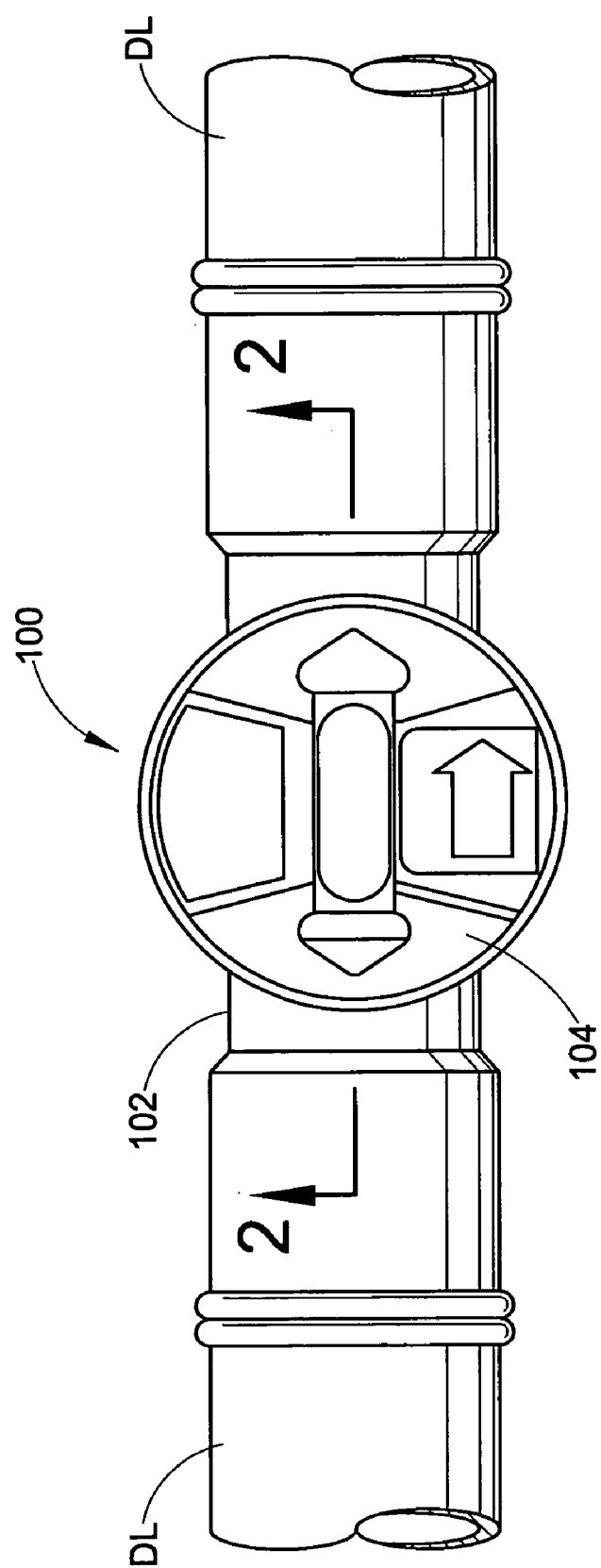
FIG. 1 is a top plan view of a combination shut-off and excess flow valve in accordance with the present invention.
Figure 2:
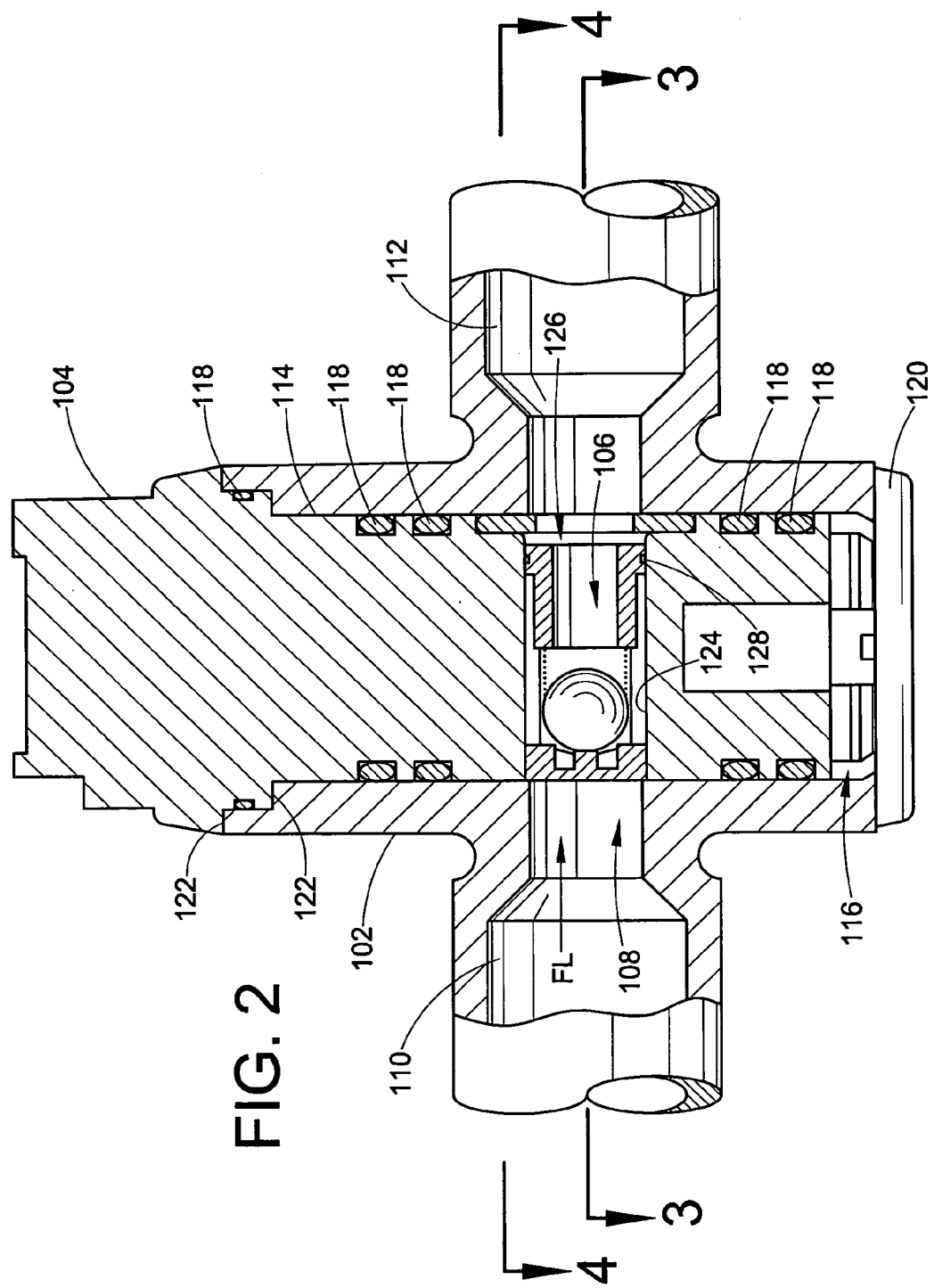
FIG. 2 is a side elevation view, partially in section, of the valve of FIG. 1 taken along line 2—2.

Turning now to the drawings wherein the showings are for the purposes of illustrating preferred embodiments of the invention only, and not for the purposes of limiting the invention, FIG. 1 shows a combination shut-off and excess flow valve 100 fluidically interconnected between two delivery lines DL, such as from a fluid distribution system (not shown), for example. Valve 100 includes a housing 102 and a valve body 104 supported on the housing. As shown in FIG. 2, valve 100 also includes an excess flow valve 106.

Housing 102 includes a passage 108 extending therethrough. The passage has an inlet portion 110 and an outlet portion 112 such that an associated fluid generally flows from the inlet portion toward the outlet portion as indicated by arrow FL. Housing 102 includes an inside wall 114 at least partially defining a generally cylindrical valve chamber 116 that receives valve body 104. A plurality of sealing members, such as o-rings 118, for example, are compressively positioned between valve body 104 and inside wall 114 of housing 102. An end cap 120 forms a bottom wall of valve chamber 116 and can include one or more features (not shown) for interengaging either the housing or the valve body. The housing and valve body include corresponding steps or shoulders 122 suitable for rotatably supporting the valve body on the housing. In one preferred embodiment, end cap 120 interengages valve body 104 thereby preventing the axial displacement of the valve body from valve chamber 116 of housing 102. It should be appreciated, however, that any suitable arrangement and/or configuration can be used.

Valve body 104 includes an inside wall 124 at least partially defining a primary passage 126 extending through the valve body. As shown in FIG. 2, excess flow valve 106 is disposed within passage 126 and a sealing member, such as an o-ring 128, for example, is compressively positioned between valve 106 and inside wall 124 of the valve body forming a substantially fluid-tight seal therebetween. It will be appreciated that excess flow valves are commonly used and typically include a displaceable flow limiting member, such as a ball BLL, for example, retained in spaced relation, such as by a spring SPR, for example, to a sealing structure, such as a flow valve wall FVW, for example. The excess flow valve can optionally include a flow valve housing FVH that receives the above components. Alternately, the components can be installed along one of passages 108 and 126, for example, with suitable features provided therealong for receiving the components. It will be understood that any suitable type, size and/or configuration of excess flow valve can be used, including bypass and non-bypass types. Furthermore, it will be likewise understood that a complete excess flow valve can be installed in a substantially fluid-tight manner along a passage in the valve body or housing, or alternately that the operative components, such as those described above, for example, can be assembled onto the housing or valve body along a passage therethrough without departing from the principles of the present invention.

Figure 3:
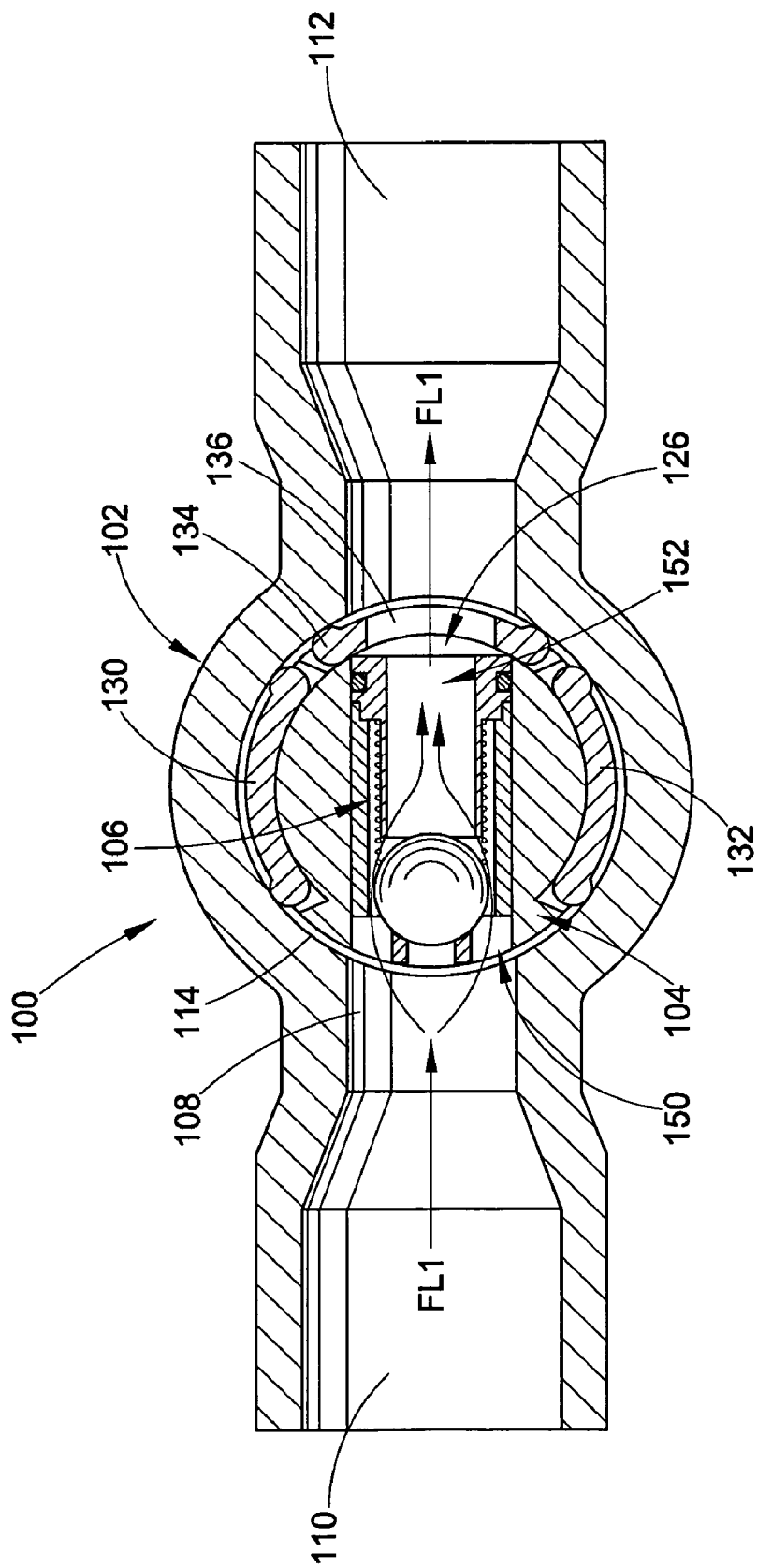
FIG. 3 is a top plan view, partially in section, of the valve of FIG. 2 taken along line 3—3 with the valve body in a first position and the excess flow valve in an open condition.

As shown in FIG. 3, valve body 104 is supported on housing 102 in a first position in which primary passage 126 is in substantial alignment with passage 108 such that inlet portion 110 and outlet portion 112 are in fluid communication with one another through passage 126. In addition to o-rings 118 (FIG. 2), one or more sealing members, such as gaskets 130, 132 and 134, for example, are sealingly positioned between valve body 104 and inside wall 114 of housing 102. The gaskets form a substantially fluid-tight seal between the valve body and the housing. Preferably, gasket 134 includes an opening 136 extending therethrough that is cooperative with primary passage 126 such that fluid through the passage is substantially unobstructed by gasket 134.

In FIG. 3, excess flow valve 106 is shown in an open condition in which fluid flows from inlet portion 110 along primary passage 126 through excess flow valve 106 to outlet portion 112 as indicated by arrows FL1. It will be appreciated that the flow condition illustrated in FIG. 3 generally corresponds to normal operating conditions of valve 100 when valve body 104 is in the first position.

Figure 3A:
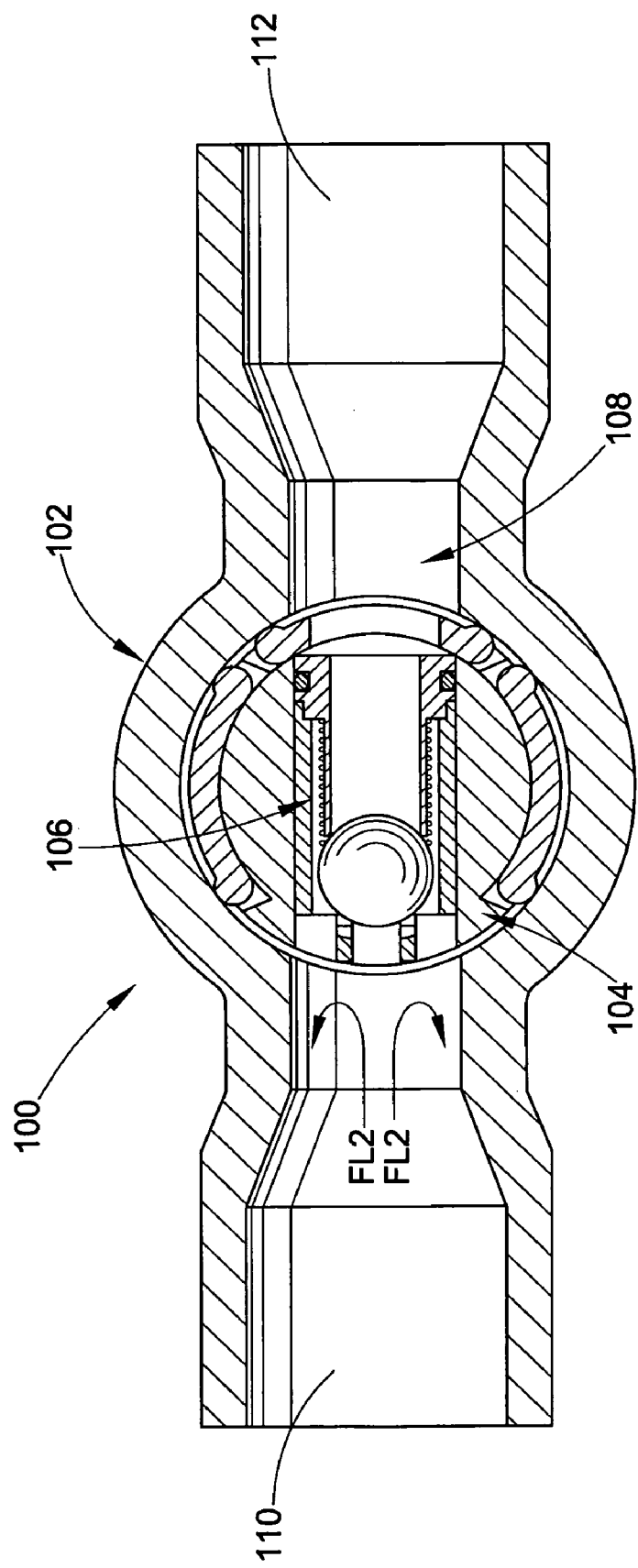
FIG. 3A is a top plan view, partially in section, of the valve shown in FIG. 3 with the excess flow valve in a closed condition.

In FIG. 3A, excess flow valve 106 is shown in a closed condition A, such as might occur where a break in a delivery line occurs downstream of valve 100, for example. In the closed condition, valve 106 substantially prevents fluid flow along passage 126. As such, fluid can not flow from inlet portion 110 to outlet portion 112, as indicated by arrows FL2.

Figure 3B:
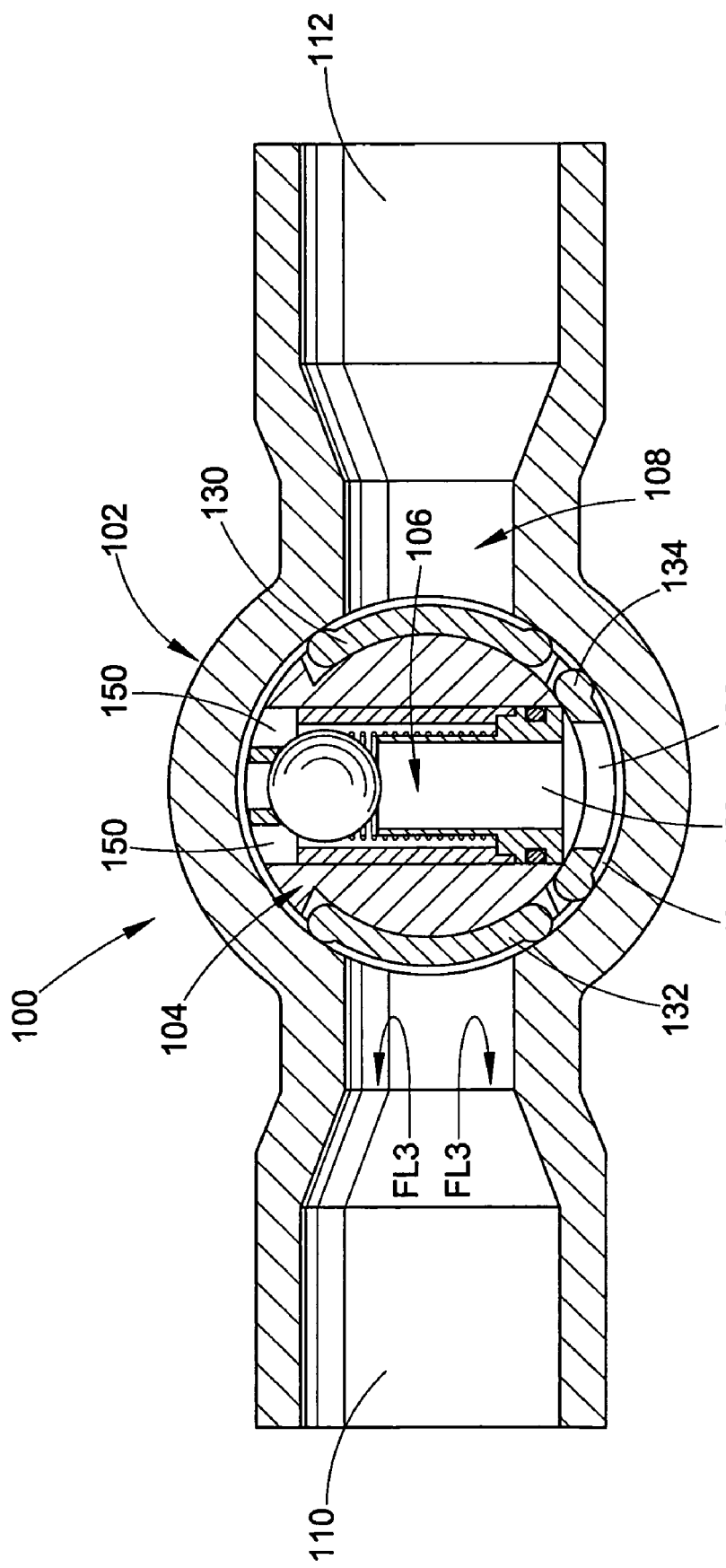
FIG. 3B is a top plan view, partially in section, of the valve of FIG. 3 with the valve body in a second position and the excess flow valve reset into an open condition.

As shown in FIG. 3B, valve body 104 is displaceable into a second position relative to housing 102. In the second position, gaskets 130 and 132 respectively extend across outlet portion 112 and inlet portion 110 of passage 108, respectively. As such, fluid flow is substantially inhibited or shut off across valve 100 as indicated by arrows FL3. Additionally, excess flow valve 106 is reset into an open condition in position two, as shown in FIG. 3B.

Figure 4:
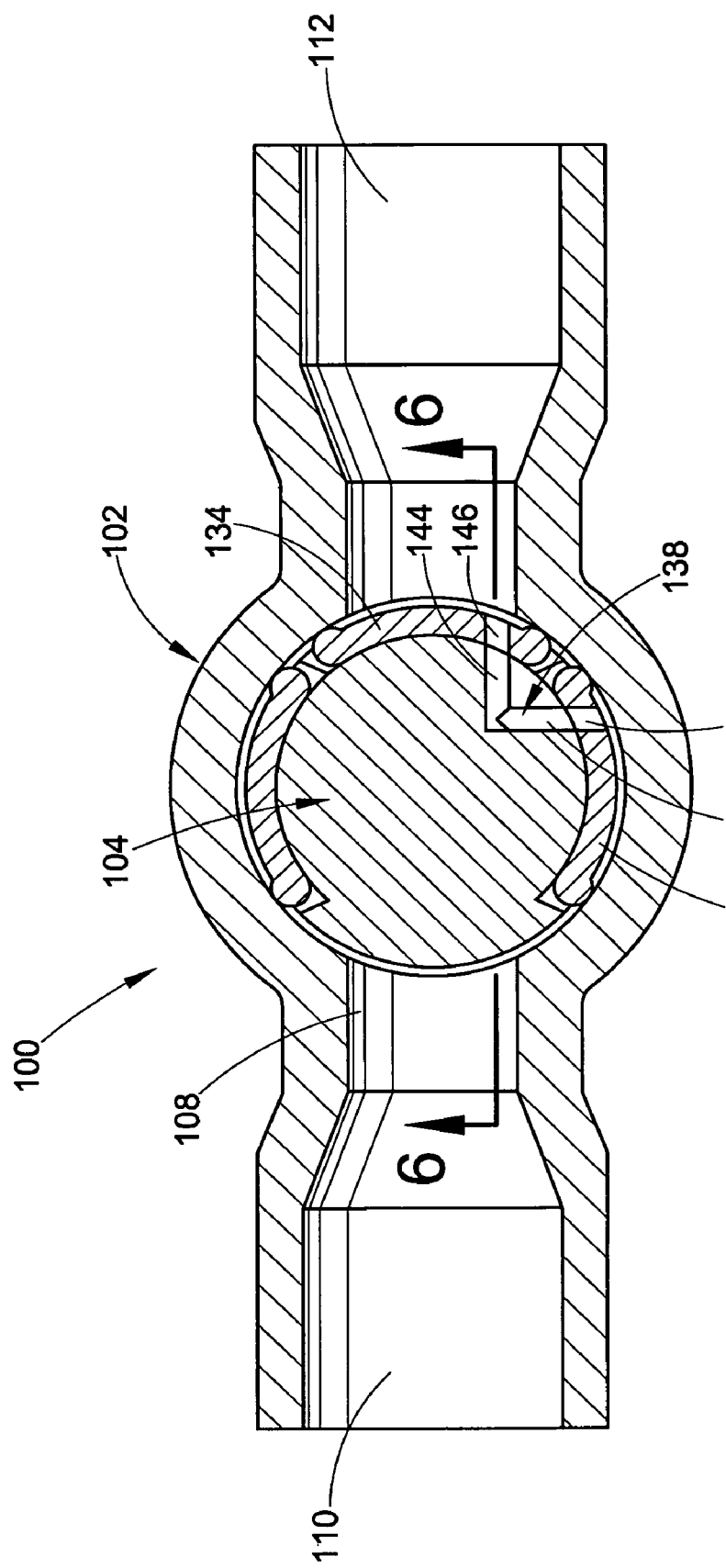
FIG. 4 is a top plan view, partially in section, of the valve of FIG. 2 taken along line 4—4 with the valve body in the first position.
Figure 4A:
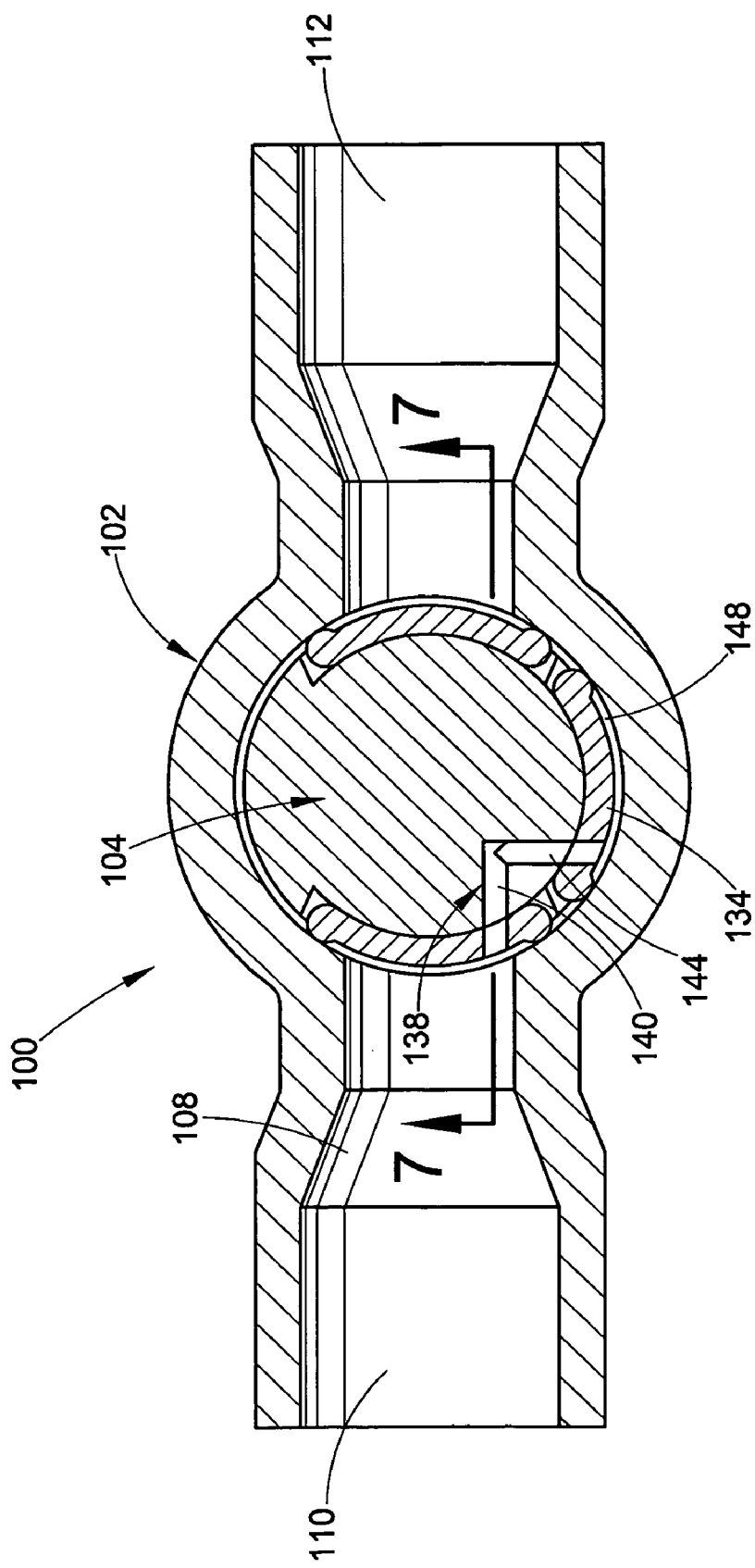
FIG. 4A is a top plan view, partially in section, of the valve of FIG. 4 with the valve body shown in the second position.

Turning to FIGS. 4 and 4A, a secondary or reset passage 138 extends through valve body 104. Reset passage 138 can take any suitable shape, form and/or configuration. As shown in FIG. 4, reset passage 138 has a first end 140 adjacent an opening 142 extending through gasket 132. Additionally, the reset passage has a second end 144 adjacent an opening 146 extending through gasket 134. In FIG. 4, valve body 104 is shown in the first position, and second end 144 of reset passage 138 is in fluid communication with outlet portion 112 of passage 108. It will be appreciated that first end 140 of the reset passage is substantially fluidically isolated from inlet portion 110 of passage 108 by gasket 132.

In FIG. 4A, valve body 104 is shown in the second position. First end 140 of reset passage 138 is in fluid communication with inlet portion 110 of passage 108. Additionally, second end 144 of the reset passage is in fluid communication with excess flow valve 106 (FIG. 3B) through a chamber 148 defined at least in part by gasket 134.

In operation, under normal flow conditions, such as is indicated by arrows FL1 in FIG. 3, for example, valve 100 will be configured such that valve body 104 is in the first position (FIGS. 3, 3A and 4) in which inflow port 150 of excess flow valve 106 is upstream of outflow port 152. Upon the occurrence of an excess flow condition, excess flow valve 106 closes, as shown in FIG. 3A, and substantially fluidically isolates inlet portion 110 from outlet portion 112 of passage 108, as indicated by arrows FL2. Prior to undertaking repairs to the portion of the delivery line or system that led to the excess flow condition, valve body 104 is moved into the second position, as shown in FIGS. 3B and 4A. In the second position, gaskets 130 and 132 substantially shut off the fluid flow across valve 100, as indicated by arrows FL3. Additionally, a portion of the fluid within inlet portion 110 flows into and out of reset passage 138 through openings 142 and 146, respectively. The fluid flows out of reset passage 138 and into and along cavity 148 to opening 136 in gasket 134. The fluid thereafter flows into and along excess flow valve 106 through outflow port 152 which is positioned upstream of inflow port 150 in position two of the valve body. The fluid flowing into and through excess flow valve 106 from outflow port 152 acts to reset the excess flow valve in a manner well understood in the art. Importantly, as indicated above, inlet portion 110 and outlet portion 112 remain substantially fluidically isolated due at least to gaskets 130 and 132 even though excess flow valve 106 has been reset. Once repairs have been completed to the line downstream of the valve, valve body 104 can be returned to the first position, as shown in FIGS. 3 and 4, with the excess flow valve reset to commence with normal operation of the system.

Figure 5:
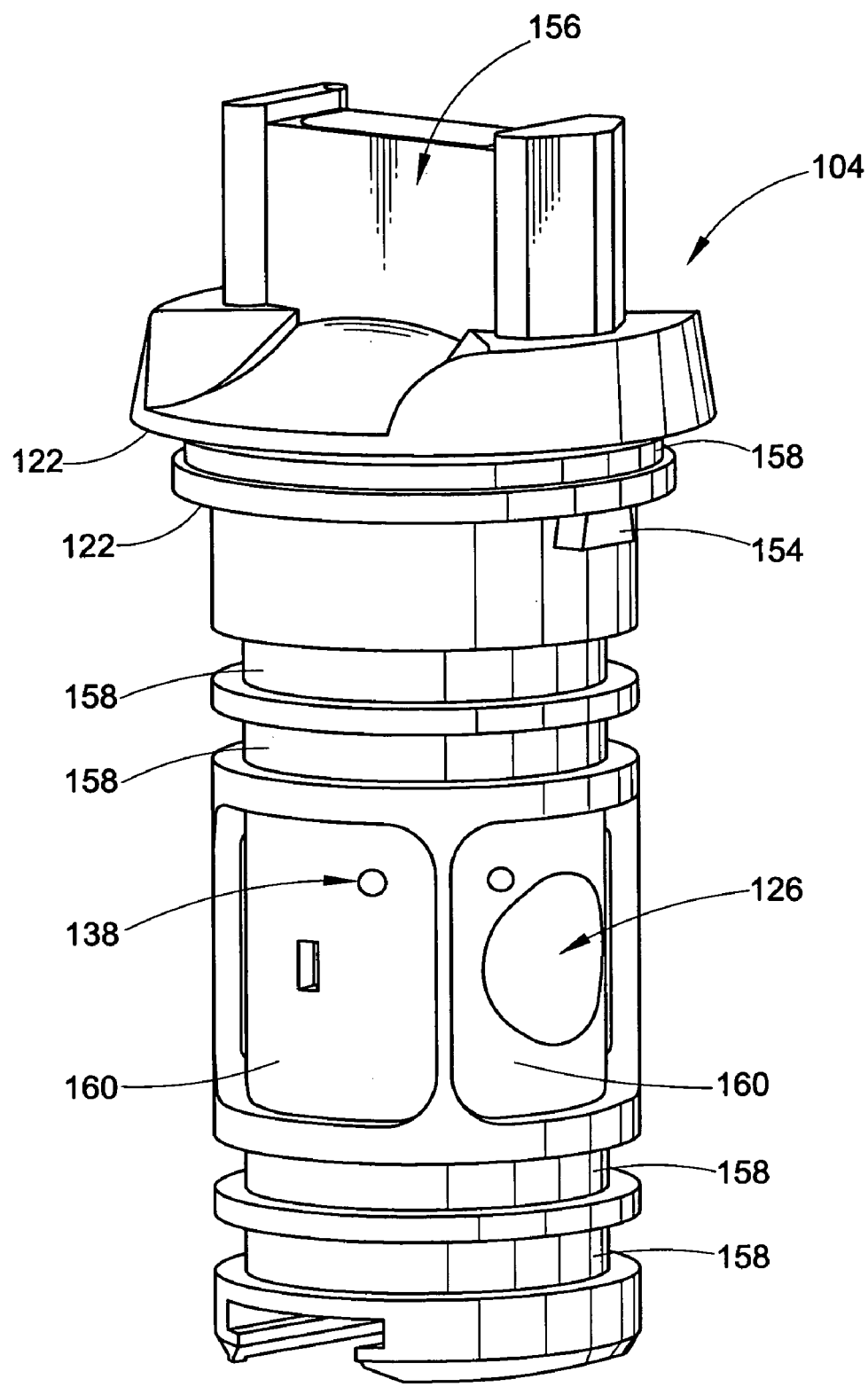
FIG. 5 is a perspective view of one embodiment of a valve body.
Figure 7:
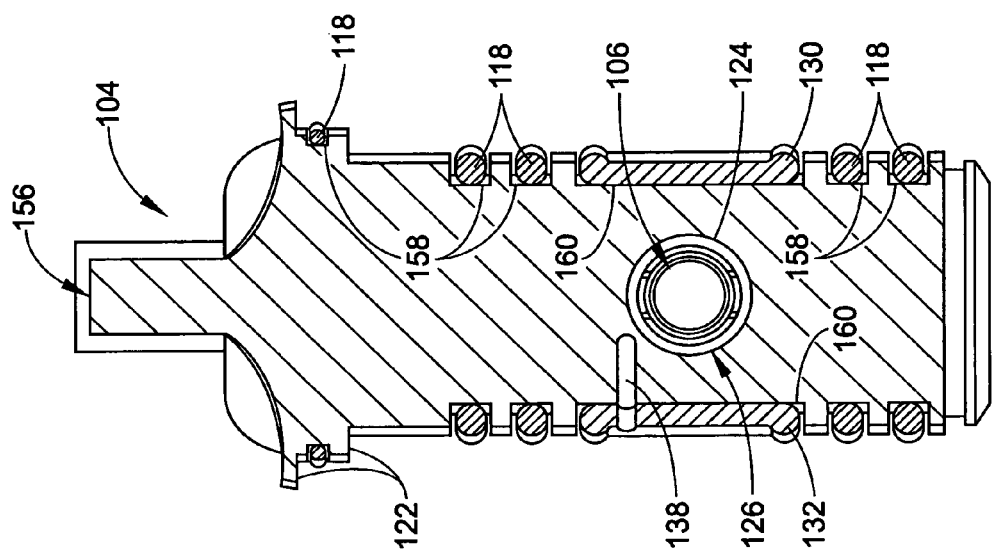
FIG. 7 is a side elevation view, partially in section, of the valve body of FIG. 4A taken along line 7—7 with the valve body in the second position.
Figure 6:
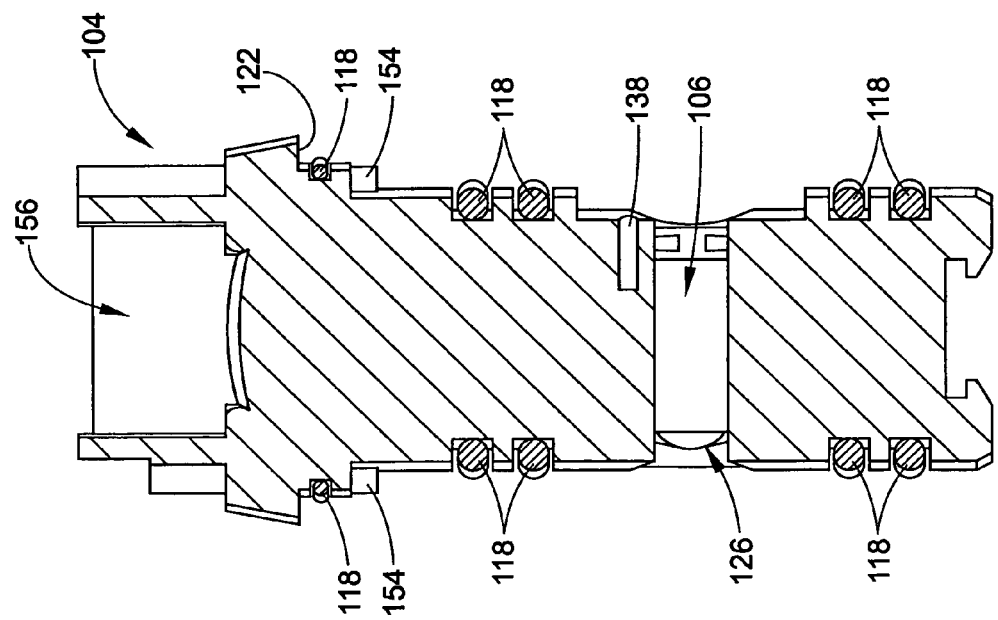
FIG. 6 is a side elevation view, partially in section, of the valve body shown in FIG. 4 taken along line 6—6 with the valve body in the first position.

Preferably, valve body 104 will be displaceable between a first position for normal operation of the valve, as discussed above, and a second position that shuts off flow through the valve and also resets the excess flow valve from a closed condition to an open condition. As shown in FIGS. 5–7, valve body 104 will now be described. The valve body includes tabs 154, shown in FIGS. 5 and 6, that interengage corresponding radial slots (not shown) in the housing to limit movement of the valve within the housing to between the first and second positions. It will be appreciated that the valve body can include one or more such projections, and that two projections are shown in the present embodiment. Valve body 104 also includes a handle portion 156 that extends outwardly from the housing and is accessible for displacing the valve body between the first and second positions. The valve body also includes shoulders 122, as discussed above, that interengage corresponding shoulders on the housing. A plurality of annular grooves 158 are provided on the valve body and are suitable for receiving and retaining sealing members, such as o-rings 118, for example. Pockets 160 are recessed into valve body 104 and are suitably dimensioned to receive and retain sealing members, such as gaskets 130, 132 and 134. Additionally, passages 126 and 138 are shown in FIGS. 6 and 7, and excess flow valve 106 is also shown as being disposed along passage 126.

Figure 8:
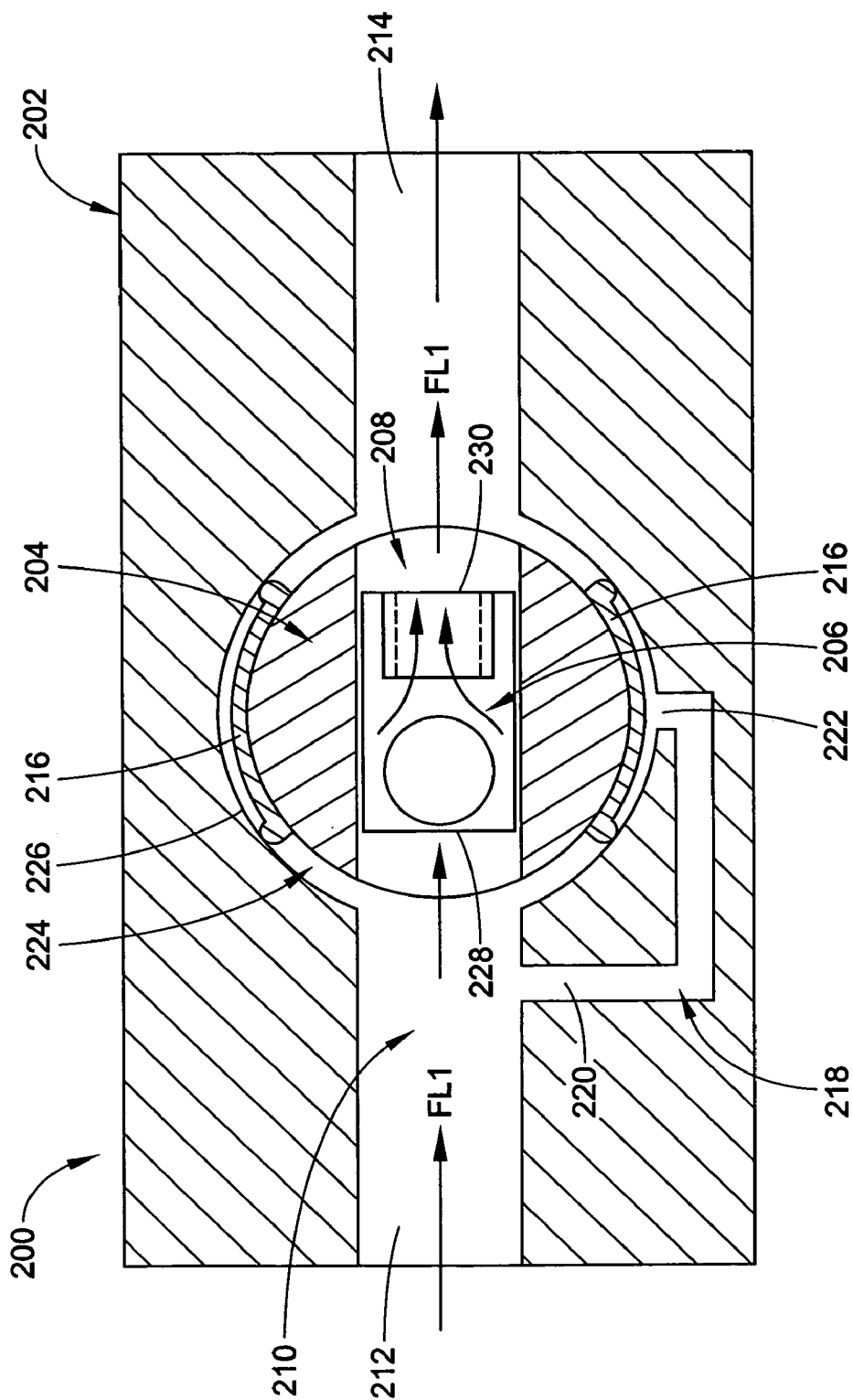
FIG. 8 is a top plan view, partially in section, of another embodiment of a combination shut-off and excess flow valve in accordance with the present invention shown with the valve body in a first position.
Figure 9:
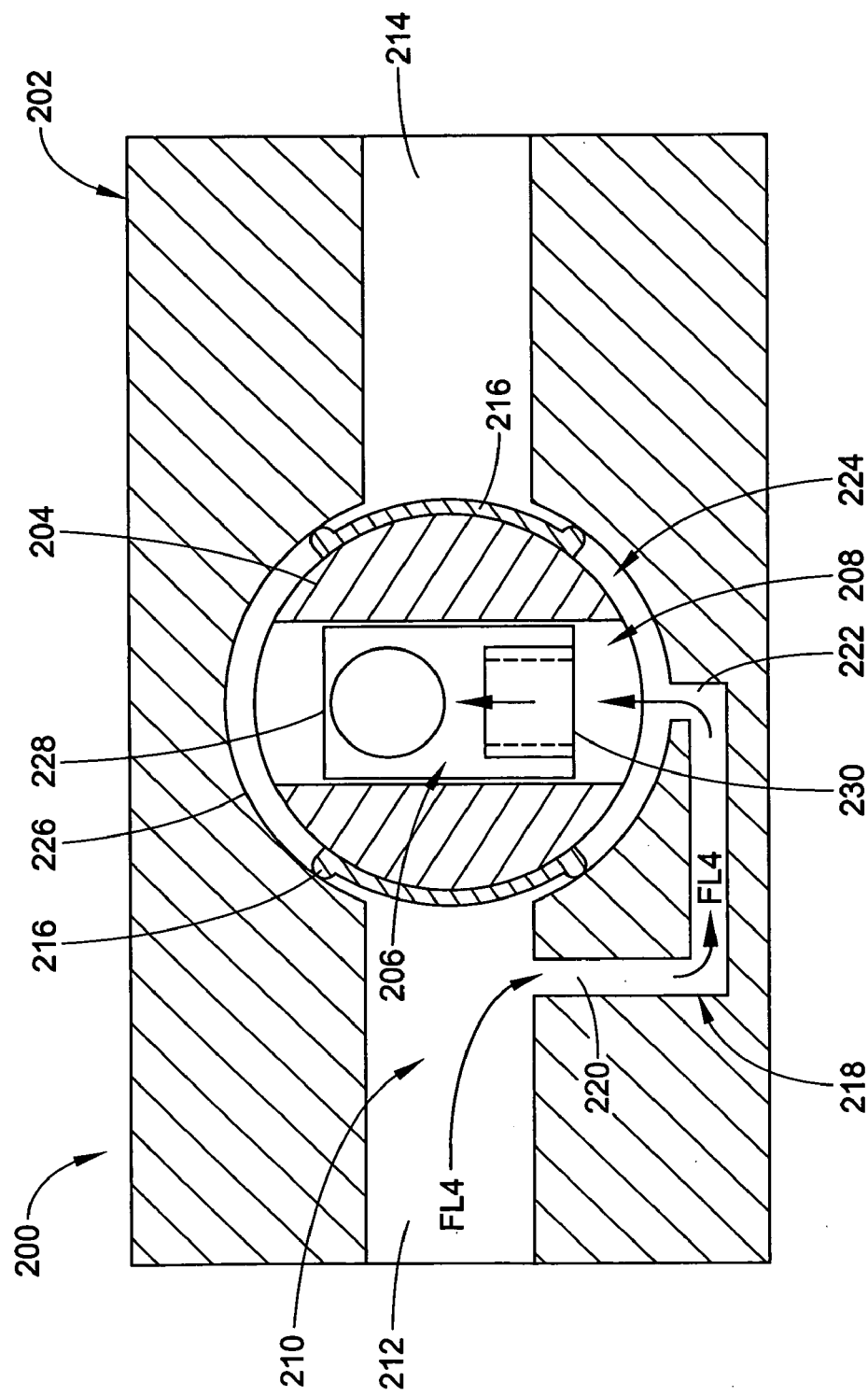
FIG. 9 is a top plan view, partially in section, of the valve shown in FIG. 8 with the valve body in a second position.

Another embodiment of a combination shut-off and excess flow valve 200 is shown in FIGS. 8 and 9. It will be appreciated that valve 200 is substantially similar to valve 100 discussed hereinbefore. As such, like details will not be reiterated, but differences between these valves will be set out in detail hereinafter. Valve 200 includes a housing 202, a valve body 204 supported on the housing and displaceable between a first position shown in FIG. 8 and a second position shown in FIG. 9. An excess flow valve 206 is disposed along a primary passage 208 extending through valve body 204. A passage 210 extends through housing 202 and includes an inlet portion 212 and an outlet portion 214. Sealing members 216 are compressively positioned between valve body 204 and housing 202 forming a substantially fluid-tight seal therebetween. A reset port 218 having a first end 220 and a second end 222 extends through housing 202 between inlet portion 212 and a valve chamber 224 formed by an inside wall 226 of housing 202. In operation, fluid flows through passage 210 from inlet portion 212 toward outlet portion 214 and along primary passage 208 of valve body 204 through excess flow valve 206. As discussed above, excess flow valves are well known and commonly used. As such, further detail of the structure and operation thereof is not provided.

Excess flow valve 206 includes an inflow port 228 and an outflow port 230. In the first position, shown in FIG. 8, fluid flows from inlet portion 212 into inflow port 228 through excess flow valve 206 and out of outflow port 230 to outlet portion 214, as indicated by arrows FL1. In FIG. 9, valve body 204 is displaced into the second position in which sealing members 216 extend substantially across the opening between inlet portion 212 and valve chamber 224 as well as across the opening between outlet portion 214 and valve chamber 224. As such, the inlet and outlet portions of passage 210 are substantially fluidically isolated from one another. In the second position, excess flow valve 206 is oriented such that outflow port 230 is adjacent second end 222 of reset passage 218 and upstream of inflow port 228. A portion of the fluid within inlet portion 110 flows into reset passage 218 through first end 220 and is delivered into primary passage 208 of valve body 204 at second end 222, as indicated by arrows FL4. The fluid acts to reset excess flow valve 206 in a manner well known by those of skill in the art. The valve body can thereafter be returned to the first position to resume normal operation.

Figure 10:
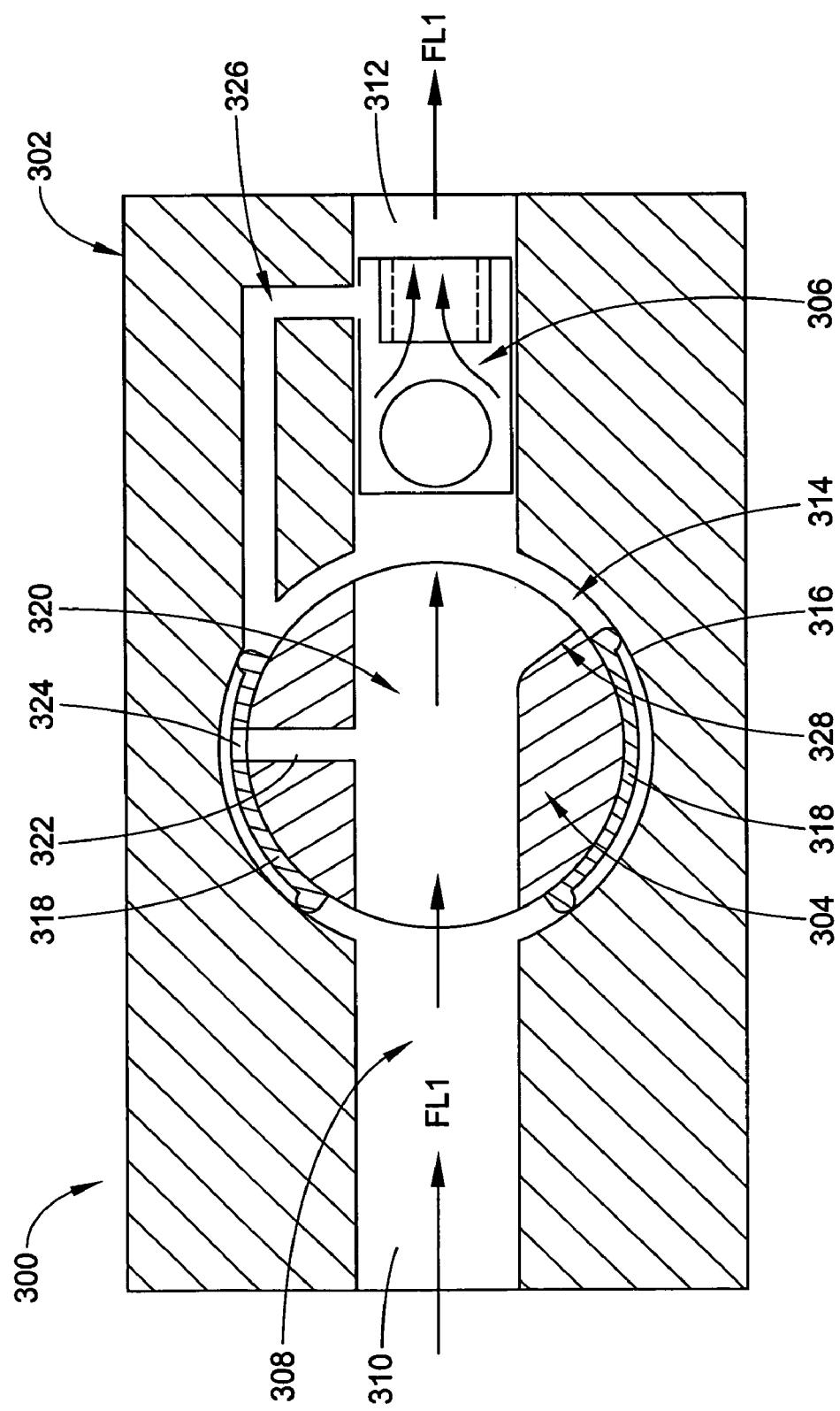
FIG. 10 is a top plan view, partially in section, of still another embodiment of a combination shut-off and excess flow valve in accordance with the present invention with the valve body shown in a first position.
Figure 11:
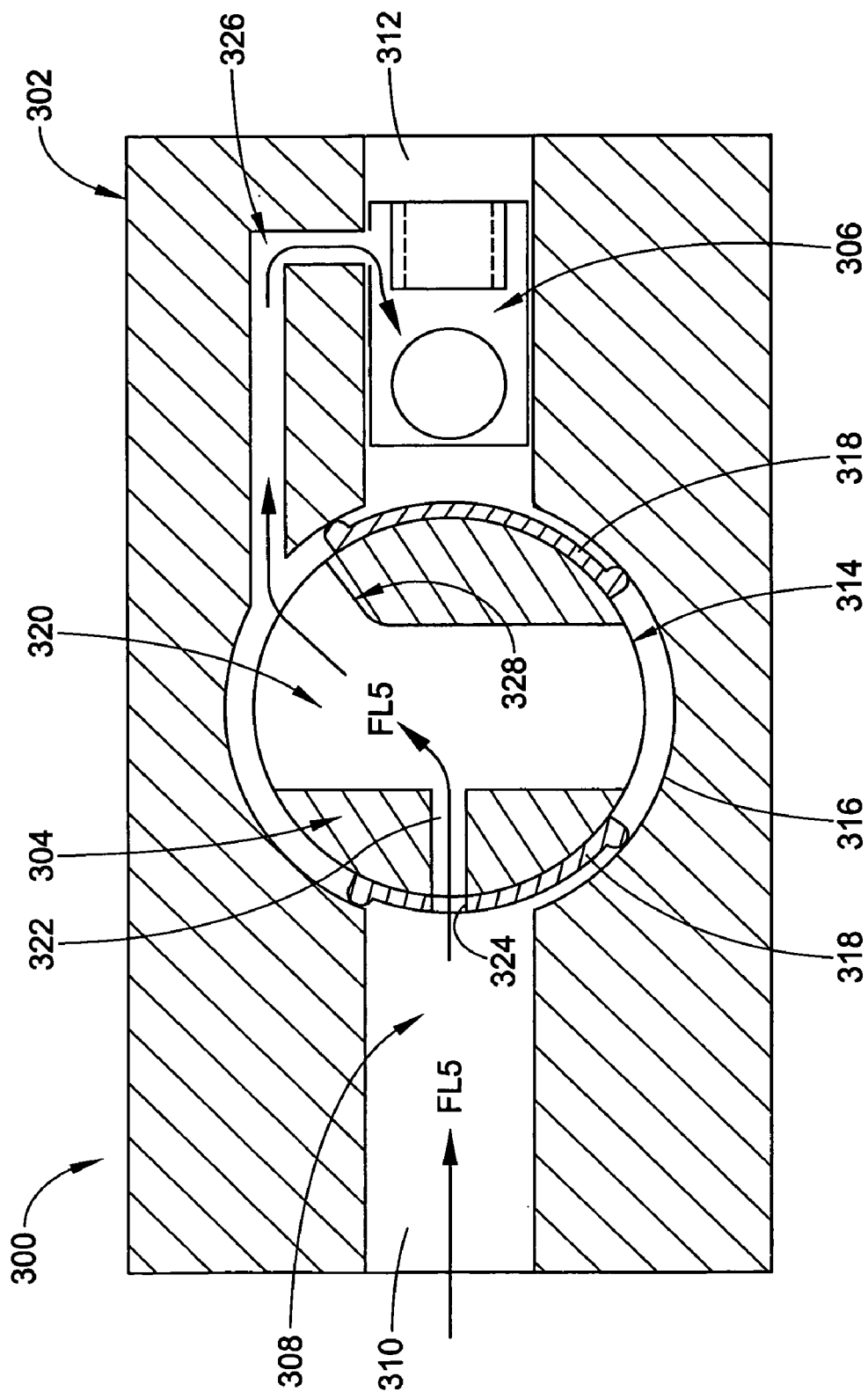
FIG. 11 is a top plan view, partially in section, of the valve of FIG. 10 with the valve body shown in a second position.

Another embodiment of a combination shut-off and excess flow valve 300 is shown in FIGS. 10 and 11. It will be appreciated that valve 300 is substantially similar to valve 100 discussed hereinbefore. As such, like details will not be reiterated hereinafter. However, differences between these valves are set out in detail hereinafter. Valve 300 includes a housing 302, a valve body 304 supported on the housing and displaceable between first and second positions, and an excess flow valve 306 disposed along a passage 308 extending through housing 302. The passage includes an inlet portion 310 and an outlet portion 312. Excess flow valve 306 is disposed along the outlet portion of the passage. Valve body 304 is supported within a valve chamber 314 formed by an inside wall 316 of housing 302. Sealing members 318 are compressively positioned between the valve body and the inside wall forming a substantially fluid-tight seal therebetween. A primary passage 320 extends through valve body 304, and a corner 328 of the valve body is relieved or otherwise removed. In the first position of the valve body, the primary passage is substantially aligned between the inlet and outlet portions of passage 308 such that the portions are in fluid communication.

During normal flow conditions, as indicated by arrows FL1 in FIG. 10, fluid flows into passage 308 at inlet portion 310 through primary passage 320, through excess flow valve 306 and out of valve 300 through outlet portion 312. Valve body 304 also includes a secondary or reset passage 322 extending through the valve body from primary passage 320. Secondary passage 322 extends through sealing member 318 at opening 324. Additionally, a housing reset passage 326 extends through the housing in fluid communication between valve chamber 314 and outlet portion 312 of passage 308. It will be appreciated from FIG. 10 that secondary passage 322 is substantially fluidically isolated from outlet portion 312 by sealing member 318.

Upon the occurrence of an excess flow condition, excess flow valve 306 will close as discussed above and thereby prevent fluid flow through valve 300. Once the situation causing the excess flow condition has been repaired, the valve body is moved to the second position to reset the excess flow valve. In FIG. 11, valve body 304 is shown in the second position, and sealing members 318 substantially fluidically isolate inlet portion 310 and outlet portion 312 of passage 308. However, secondary reset passage 322 is in fluid communication with inlet portion 310 such that fluid can flow through passage 322 into passage 320 and along housing reset passage 326 into outlet portion 312. As such, once repairs are completed and the downstream line becomes pressurized from the flow through housing reset passage 326, excess flow valve will reset and the valve body can be returned to the first position for the resumption of normal operation.

Figure 12:
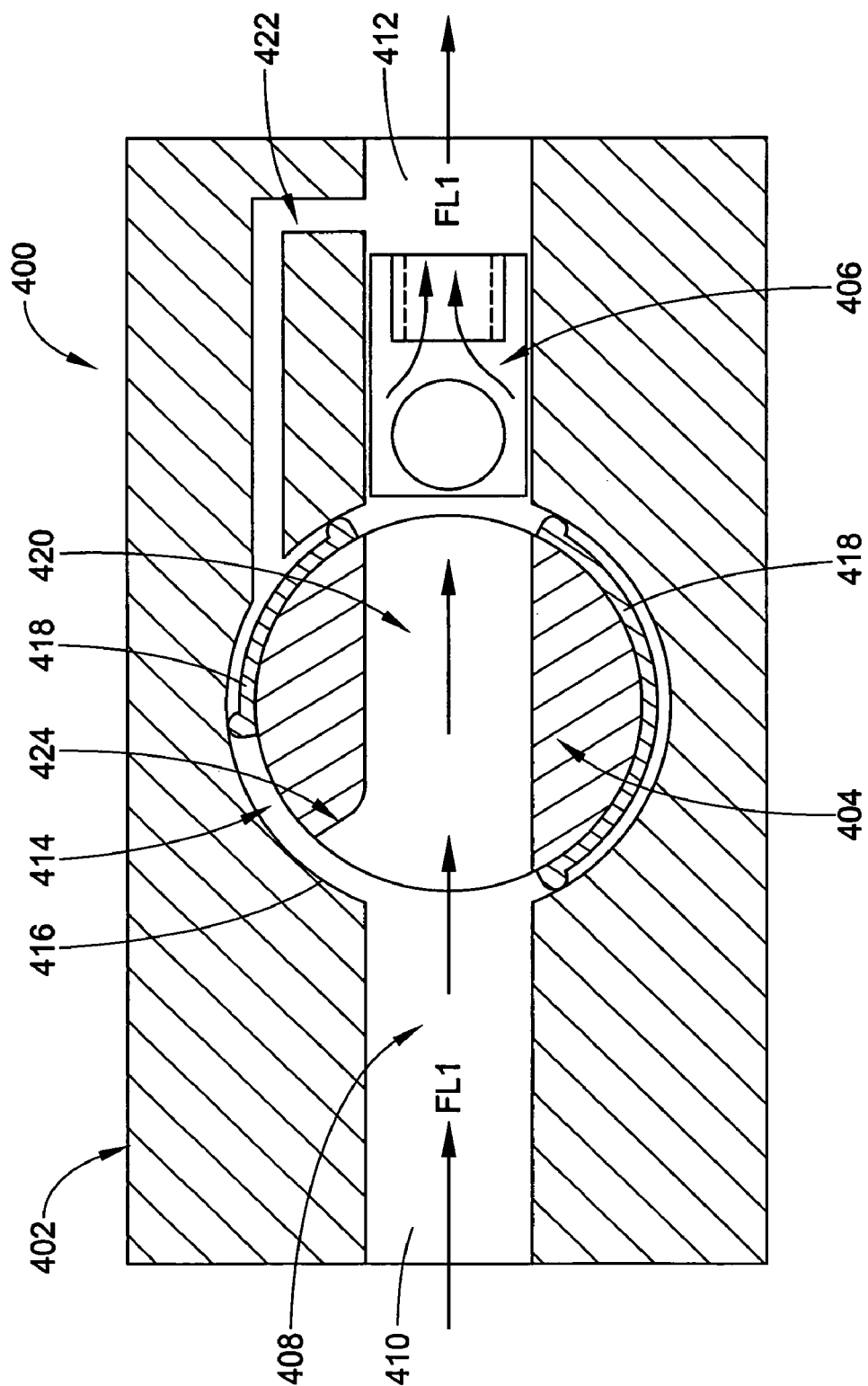
FIG. 12 is a top plan view, partially in section, of yet another embodiment of a combination shut-off and excess flow valve in accordance with the present invention with the valve body shown in a first position.

Still another embodiment of a combination shut-off and excess flow valve 400 is shown in FIGS. 12 and 13. It will be appreciated that valve 400 is substantially similar to valve 100 discussed hereinbefore. As such, like details will not be reiterated hereinafter. However, differences between these valves are set out in detail hereinafter. Valve 400 includes a housing 402, a valve body 404 supported on the housing, and an excess flow valve 406 disposed along a passage 408 extending through the housing. Passage 408 has an inlet portion 410, an outlet portion 412 and a valve chamber 414 in fluid communication therebetween. The valve chamber is formed, at least in part, by an inside wall 416. Sealing members 418 are compressively positioned between valve body 404 and inside wall 416 to form a fluid-tight seal therebetween. A primary passage 420 extends through valve body 404. In the first position of the valve body, shown in FIG. 12, passage 420 is substantially aligned along passage 408 between the inlet and outlet portions thereof. As such, in operation fluid flows into valve 400 through inlet portion 410 of passage 408, through passage 420 and excess flow valve 406, and flows out of the valve through outlet portion 412, as indicated by arrows FL1. A reset passage 422 extends through housing 402 between valve chamber 414 and outlet portion 412 of passage 408. In the first position of the valve body, reset passage 422 is substantially fluidically isolated from inlet portion 410 by sealing member 418.

As shown in FIG. 13, valve body 404 is displaceable into a second, reset position. It will be appreciated that the valve body in this or other embodiments can be rotated through any suitable angle to reach the second position. For example, valve body 404 rotates through an angle A1 of about 45 degrees relative to housing 402, as shown in FIG. 13. It will be appreciated, however, that in this and other embodiments an angle of from about 45 degrees to about 135 degrees could be used without departing from the principles of the present invention. In the second position, inlet portion 410 and outlet portion 412 of passage 408 are substantially fluidically isolated from one another. Fluid does flow therebetween, however, as indicated by arrows FL6. A corner 424 of valve body 404 is relieved or otherwise removed such that inlet portion 410 is in fluid communication with passage 420 of the valve body in the second position. Passage 420 is also in fluid communication with housing reset passage 422. As such, in the second position, fluid flowing into valve 400 is substantially shut off, except for a significantly reduced fluid flow passing into passage 420 and flowing along reset passage 422 to reach outlet portion 412.

In operation, fluid flows into valve 400 through inlet portion 410, through passage 420, through excess flow valve 406 and out of outlet portion 412. Upon the occurrence of an excess flow condition, excess flow valve 406 closes in a typical manner and acts to shut off fluid flow along the downstream delivery lines (not shown). Once the condition that caused the excess flow to occur has been repaired, the excess flow valve can be reset by displacing the valve body into the second position and allowing fluid to flow through passages 420 and 422 to re-pressurize the downstream delivery line. Once sufficient downstream pressure is reached, excess flow valve 406 will reset and the valve body can be returned to the first position for normal operation.

While the invention has been described with reference to the preferred embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of the appended claims and the equivalents thereof.

The invention claimed is:

1. A valve operable with an associated fluid delivery system having fluid flow therethrough, said valve comprising:
    a housing including a first passage having an inlet portion and an outlet portion;
    a valve body disposed along said first passage between said inlet and outlet portions, and including second and third passages extending through said valve body; and,
    a resetable excess flow valve having an inlet port, an outlet port and being supported along said second passage;
    said valve body being supported on said housing for movement between a first position permitting fluid flow through said second passage and a second position substantially shutting-off fluid flow through said second passage and when said valve body is in said second position said third passage is in fluid communication with said outlet port and said outlet port is placed into fluid communication with said inlet portion of said first passage through said third passage to thereby reset said excess flow valve.

2. A valve according to claim 1 further comprising a sealing member supported between said valve body and said housing, said sealing member substantially fluidically isolating said inlet portion of said first passage from said outlet portion of said first passage when said valve body is in said second position.

3. A valve according to claim 2, wherein said sealing member includes a sealing member wall having a first sealing member opening formed therethrough, and said sealing member is disposed along said valve body such that said first sealing member opening is in fluid communication with said second passage.

4. A valve according to claim 1, wherein said valve body rotates with respect to said housing between said first and second positions.

5. A valve according to claim 4, wherein said second position of said valve body is oriented at an angle of about 90 degrees from said first position.

6. A combination shut-off and resetable excess flow valve comprising:
    a housing including a first passage extending therethrough, said first passage including an inlet portion and an outlet portion;
    a valve body supported on said housing and disposed along said first passage between said inlet and outlet portions, said valve body displaceable between a first position and a second position, said valve body including a first wall at least partially forming a second passage and a second wall at least partially forming a third passage with each of said second and third passages extending through said valve body;

a sealing member forming a substantially fluid-tight seal between said valve body and said housing; and, an excess flow valve supported along said first wall of said valve body within said second passage, said excess flow valve having a first end and a second end;

said second passage being substantially aligned with said first passage in said first position of said valve body such that said inlet portion and said outlet portion are in fluid communication and said first end of said excess flow valve is operatively associated with said inlet portion of said first passage;

said valve body substantially fluidically isolating said inlet portion and said outlet portion from one another in said second position, and said second end of said excess flow valve being operatively associated with said inlet portion of said first passage in said second position of said valve body.

7. A valve according to claim 6, wherein said second end of said excess flow valve is in fluid communication with said inlet portion of said first passage in said second position of said valve body through said third passage.

8. A valve according to claim 6, wherein said excess flow valve includes a flow valve housing received within one of said first passage and said second passage and a flow limiting member displaceably supported within said flow valve housing.

9. A valve according to claim 6, wherein said sealing member is a first sealing member and said valve further comprises a second sealing member compressively positioned between said excess flow valve and one of said housing and said valve body.

10. A valve according to claim 6, wherein said third passage includes a first portion extending through said valve body in approximate alignment with said second passage and a second portion extending through said valve body in approximately transverse relation to said first portion.

11. A valve comprising:
a housing including a first passage extending therethrough between opposing ends;

a valve body supported on said housing and disposed along said first passage, said valve body being displaceable between first and second positions, said valve body including a second passage extending therethrough that is in fluid communication between said opposing ends in said first position of said valve body;

a sealing member sealingly positioned between said valve body and said housing;

an excess flow valve disposed along said second passage and transformable between a first condition and a second condition; and, means provided on said valve body for resetting said excess flow valve from said second condition to said first condition with said valve body in said second position and in which second position said opposing ends of said first passage are substantially fluidically isolated from one another.

12. A valve according to claim 11, wherein said valve body is rotatably displaceable between said first and second positions, and said second position is oriented at an angle of about 90 degrees from said first position.

13. A method of operating a valve adapted for use in a fluid delivery system susceptible to an excess flow condition, said method comprising steps of:

a) providing a valve including a housing with a first passage extending therethrough between an inlet port and an outlet port, a valve body disposed along said first passage and including a second passage and a third passage, and an excess flow valve (EFV) supported along said second passage;

b) after experiencing an excess flow condition, resetting said EFV by displacing said valve body from a first, flow permitting position to a second, shut-off and EFV reset position in which second position said inlet and outlet ports of said first passage are fluidically isolated from one another and in which second position said inlet port of said first passage and said second passage are in fluid communication through said third passage thereby permitting pressurized fluid to be delivered to said EFV for resetting said EFV; and, c) returning said valve body to said first position to permit fluid flow through said valve.

14. A method according to claim 13, wherein displacing said valve body from said first, flow permitting position to said second, shut-off and EFV reset position includes rotating said valve body through an angle of about 90 degrees.

15. A valve according to claim 3, wherein said sealing member includes a second sealing member opening formed through said sealing member wall, and said second sealing member opening is in fluid communication with a first end of said third passage.

16. A valve according to claim 15, wherein said sealing member is a first sealing member and said valve further comprises a second sealing member supported between said valve body and said housing.

17. A valve according to claim 16, wherein said second sealing member includes a sealing member wall having a first sealing member opening formed therethrough, and said second sealing member is disposed along said valve body such that said first sealing member opening jam fluid communication with a second end of said third passage.

18. A valve according to claim 16 further comprising a third sealing member supported between said valve body and said housing.

* * * * *

UNITED STATES PATENT AND TRADEMARK OFFICE
CERTIFICATE OF CORRECTION

| | | |
|---|---|---|
| PATENT NO. | : 7,178,544 B2 | Page 1 of 1 |
| APPLICATION NO. | : 10/903195 | |
| DATED | : February 20, 2007 | |
| INVENTOR(S) | : David L. Robison | |

It is certified that error appears in the above-identified patent and that said Letters Patent is hereby corrected as shown below:

Column 12, lines 42-47, delete claim 17 and insert the following;

17. A valve according to claim 16, wherein said second sealing member includes a sealing member wall having a first sealing member opening formed therethrough, and said second sealing member is disposed along said valve body such that said first sealing member opening is in fluid communication with a second end of said third passage.

Signed and Sealed this

First Day of May, 2007

JON W. DUDAS
*Director of the United States Patent and Trademark Office*